United States Patent
Islinger et al.

(10) Patent No.: US 10,647,215 B2
(45) Date of Patent: May 12, 2020

(54) BALANCED COIL FOR MULTI-FILAR WINDINGS

(71) Applicant: WiTricity Corporation, Watertown, MA (US)

(72) Inventors: Simon Islinger, Munich (DE); Leandro Alberto Percebon, Munich (DE); Nicholas Athol Keeling, Munich (DE)

(73) Assignee: WiTricity Corporation, Watertown, MA (US)

( * ) Notice: Subject to any disclaimer, the term of this patent is extended or adjusted under 35 U.S.C. 154(b) by 17 days.

(21) Appl. No.: 16/140,436

(22) Filed: Sep. 24, 2018

(65) Prior Publication Data

US 2019/0100107 A1 Apr. 4, 2019

Related U.S. Application Data

(60) Provisional application No. 62/565,770, filed on Sep. 29, 2017.

(51) Int. Cl.

| | |
|---|---|
| *B60L 53/12* | (2019.01) |
| *H01F 38/14* | (2006.01) |
| *H01F 27/38* | (2006.01) |
| *H02J 50/12* | (2016.01) |
| *H01F 27/36* | (2006.01) |

(52) U.S. Cl.
CPC ............ *B60L 53/12* (2019.02); *H01F 27/365* (2013.01); *H01F 27/38* (2013.01); *H01F 38/14* (2013.01); *H02J 50/12* (2016.02)

(58) Field of Classification Search
CPC .......... B60L 53/12; H01F 38/14; H01F 27/38; H01F 27/365; H02J 50/12
USPC .................................. 320/108, 109, 115, 113
See application file for complete search history.

(56) References Cited

U.S. PATENT DOCUMENTS

| | | | |
|---|---|---|---|
| 2008/0067990 A1* | 3/2008 | Wei ...................... | H01F 27/2804 323/271 |
| 2016/0020016 A1* | 1/2016 | Ouyang .................. | H02M 1/10 307/31 |

* cited by examiner

*Primary Examiner* — Phallaka Kik
(74) *Attorney, Agent, or Firm* — Colby Nipper PLLC

(57) ABSTRACT

A magnetic coil suitable for wireless power transfer comprises a layer of magnetically-permeable material and plural conductors that follow respective convoluted paths relative to the layer of magnetically-permeable material to form respective inductors. In use, the conductors have substantially equalized inductances based on the convoluted paths and interaction with the magnetically-permeable material. One way of achieving this is to place the conductors such that the overall proximity of the conductors to the layer of magnetically-permeable material along their respective lengths is substantially equal. In this way, the conductors are positioned substantially symmetrically with respect to the layer of magnetically-permeable material, such that an average distance of each individual section of the conductors proximate to the permeable layer is equal.

24 Claims, 7 Drawing Sheets

BALANCED COIL FOR MULTI-FILAR WINDINGS

RELATED APPLICATIONS

This application claims the benefit of and priority to U.S. Provisional Appl. Ser. No. 62/565,770 filed on Sep. 29, 2017, the disclosure of which is incorporated herein by reference in its entirety.

FIELD

The present disclosure related generally to wireless power transfer, and more specifically to an inductive power transfer system, such as a wireless electric vehicle charging (WEVC) system. In particular, the present disclosure relates to a magnetic coil for wireless power transfer.

BACKGROUND

Wireless power transfer techniques are increasingly being used to transfer power from electrical power sources to a wide range of devices from small hand-held consumer electronics devices, such as mobile phones and tablets requiring a few watts of power, to electric vehicles requiring kilowatts of power. In addition to the convenience of not having to plug in a device to power it or recharge its batteries, the absence of wires and cables makes for tidier desks and parking spaces, while reducing clutter and hazards such as trip and shock hazards. In some systems, power may be transferred wirelessly via a capacitive coupling or an inductive coupling, both of which offer advantages over resistive (e.g., wired) coupling for the purpose of supplying power to a device.

Wireless power transfer systems can be designed to operate at fixed or variable frequencies. in addition, wireless power transfer systems can be designed to deliver anything from a few watts of power to many kilowatts across a gap between plates of a capacitor or magnetic coils coupling a power source and a load. Typically the gap is an air gap. The energy thus delivered may be used, for example, to power an electronics circuit, to drive an electric motor in an electric vehicle, or to charge batteries in the electronics circuit or vehicle. Powering a cell phone or charging its battery requires a few watts, whereas powering the motor in an electric vehicle or charging the battery requires several kilowatts. The larger the battery circuit or motor, or the faster the battery is required to charge, the more power is needed to be transferred across the air gap.

Wireless power transfer techniques have developed in different fields of technology, which has resulted in different terms being used to describe essentially the same element or component. Such terms as 'magnetic resonance,' 'magnetic coupling,' 'magnetic induction,' 'inductive power transfer', and 'resonant inductive power transfer' are common. Although there are differences, these terms are generally used broadly and interchangeably to refer to systems that transfer power from a source across an air gap to a load by way of a magnetic field.

Similarly, such terms as 'magnetic coils', 'induction coils', and 'antennas' are used essentially interchangeably to describe the parts of a wireless power system that transfer energy across the air gap. More precisely, these terms refer to elements that are coils rather than antennas because at typical operating frequencies they transfer energy in the near field where the magnetic field is dominant. Antennas are designed with an electromagnetic field in mind, which forms once radiated energy passes from beyond the near field to the far field. Where the near field ends and the far field begins depends on characteristics of the transmitting device (e.g., coil or antenna). For wireless power transfer applications, an exact definition is usually unnecessary because the size of the air gap and the frequencies that the system operates places it firmly in the near field. Nevertheless, the aforementioned 'magnetic coils,' 'induction coils', and 'antennas' are similarly used interchangeably by those active in the art of wireless power transfer.

Wireless power transfer systems may use magnetic coils either alone or coupled with other tuned or tunable elements. In electric vehicle power transfer applications, a base power-transfer apparatus may contain a coil in combination with associated driving electronics or it may contain the coil with some or all the associated electronics being provided in a separate enclosure. Either way, the coil in the base power-transfer apparatus is used to transmit power via a magnetic field. Similarly, a vehicle power-transfer apparatus may contain a coil in combination with associated control electronics or it may contain the coil with some or all the associated electronics being provided in a separate enclosure. Either way, the coil in the vehicle power-transfer system is used to receive power via a magnetic field.

The term 'power-transfer apparatus' is used herein in a variety of different ways. It is used to identify an enclosure containing the coil, e.g., the 'base power-transfer apparatus' or the 'vehicle power-transfer apparatus.' It is also used to identify the coil itself. The term 'power-transfer apparatus' is used herein primarily with reference to the units for the ground (e.g., base) and for the vehicle with clarification where necessary, e.g., where the use of the term is not self-evident from the context of its use.

SUMMARY

As defined in the claims, the invention provides a magnetic coil for wireless power transfer, an inductive power transfer system, a base power-transfer apparatus for a wireless electric vehicle charging system, a vehicle power-transfer apparatus for a wireless electric vehicle charging system, and a wireless electric vehicle charging system.

A magnetic coil structure suitable for wireless power transfer comprises a layer of magnetically-permeable material and plural conductors that follow respective convoluted paths relative to the layer of magnetically-permeable material to form respective inductors. In use, the conductors have substantially equalized inductances based on the convoluted paths and interaction with the magnetically-permeable material. Each conductor has a degree of interaction with the magnetically-permeable material substantially along its length. The convoluted paths may be formed such that the degree of interaction is substantially equal for each conductor. One way of achieving this is to place the conductors such that the overall proximity of the conductors to the layer of magnetically-permeable material along their respective lengths is substantially equal. In this way, the conductors are positioned substantially symmetrically with respect to the layer of magnetically-permeable material, such that an average distance of each individual section of the conductors proximate to the layer of magnetically-permeable material is equal.

In aspects, a magnetic coil structure for wireless power transfer is disclosed. The magnetic coil structure includes a layer of magnetically-permeable material and a plurality of conductors. The plurality of conductors each follow respective convoluted paths relative to the layer of magnetically-permeable material to form respective inductors. In addition, each conductor of the plurality of conductors has a respective overall proximity to the layer of magnetically-permeable material along a respective length of the conductor that is substantially equal to an overall proximity of another conductor of the plurality of conductors to the layer of magnetically permeable material along a length of the other conductor. The plurality of conductors also have substantially equalized inductances based on the convoluted paths and interaction with the magnetically-permeable.

In aspects, a base power-transfer apparatus for a wireless electric vehicle charging system is disclosed. The base power-transfer apparatus comprises a power converter for converting power from a power supply into a power signal and a coil structure configured to be driven by the power signal to generate a magnetic field. The coil structure includes a layer of magnetically-permeable material and a plurality of conductors. The plurality of conductors include respective overall proximities to the layer of magnetically-permeable material along respective lengths of the plurality of conductors that are substantially equal. The plurality of conductors follow respective convoluted paths relative to the layer of magnetically-permeable material to form respective inductors. In addition, the plurality of conductors have substantially equalized inductances based on the convoluted paths and interaction with the magnetically-permeable material.

In another aspect, a vehicle power-transfer apparatus for a wireless electric vehicle charging system is disclosed. The vehicle power-transfer apparatus includes a coil structure configured to receive power from a magnetic field. The coil structure includes a layer of magnetically-permeable material, a plurality of conductors, and control circuitry. The plurality of conductors follow respective convoluted paths relative to the layer of magnetically-permeable material to form respective inductors. A first conductor of the plurality of conductors includes a first overall proximity to the layer of magnetically-permeable material along a length of the first conductor that is substantially equal to a second overall proximity of a second conductor of the plurality of conductors to the layer of magnetically-permeable material along a length of the second conductor. The plurality of conductors are also configured to interact with the magnetically-material of magnetically-permeable material based on the convoluted paths to substantially equalize inductances of the plurality of conductors. The control circuitry is configured to control delivery of power from the coil structure to a battery.

In aspects, a magnetic coil structure for wireless power transfer is disclosed. The coil structure includes a layer of magnetically-permeable material, a first coil, and a second coil. The first coil includes a first plurality of turns and is wound to enclose a first opening and a second opening adjacent to the first opening. The first coil has a first outer portion, a middle portion, and a second outer portion that is on an opposite side of the middle portion relative to the first outer portion. The second coil includes a second plurality of turns and is wound to enclose the first opening and the second opening. The second coil has a first outer portion, a middle portion, and a second outer portion that is on an opposite side of the middle portion of the second coil relative to the first outer portion of the second coil. In addition, the first outer portion of the first coil is stacked above the first outer portion of the second coil, and the second outer portion of the first coil is stacked below the second outer portion of the second coil The features disclosed herein are set forth with particularity in the claims and together with advantages thereof may become clearer to those possessed of the appropriate skill from consideration of the following detailed description given by way of example with reference to the accompanying drawings.

DETAILED DESCRIPTION

The following description is given with reference to a wireless electric vehicle charging (WEVC) system. The ideas presented herein, however, can equally be applied to other wireless power transfer systems including those designed for such applications as the charging of commercial electronics devices (e.g., cell phones and tablets) and power transfer to larger devices (e.g., laptop computers). The system as described is suitable for charging electric vehicles (EV) and plug-in hybrid electric vehicles (PHEV). The WEVC system uses alternating electric current (AC) magnetic fields to couple power from a base power-transfer apparatus to a vehicle power-transfer apparatus to charge the vehicle's batteries. The same ideas could also be used in a dynamic wireless power transfer system for vehicles, where power is transferred from equipment in a roadway to a vehicle as the vehicle travels along the roadway.

Figure 1:
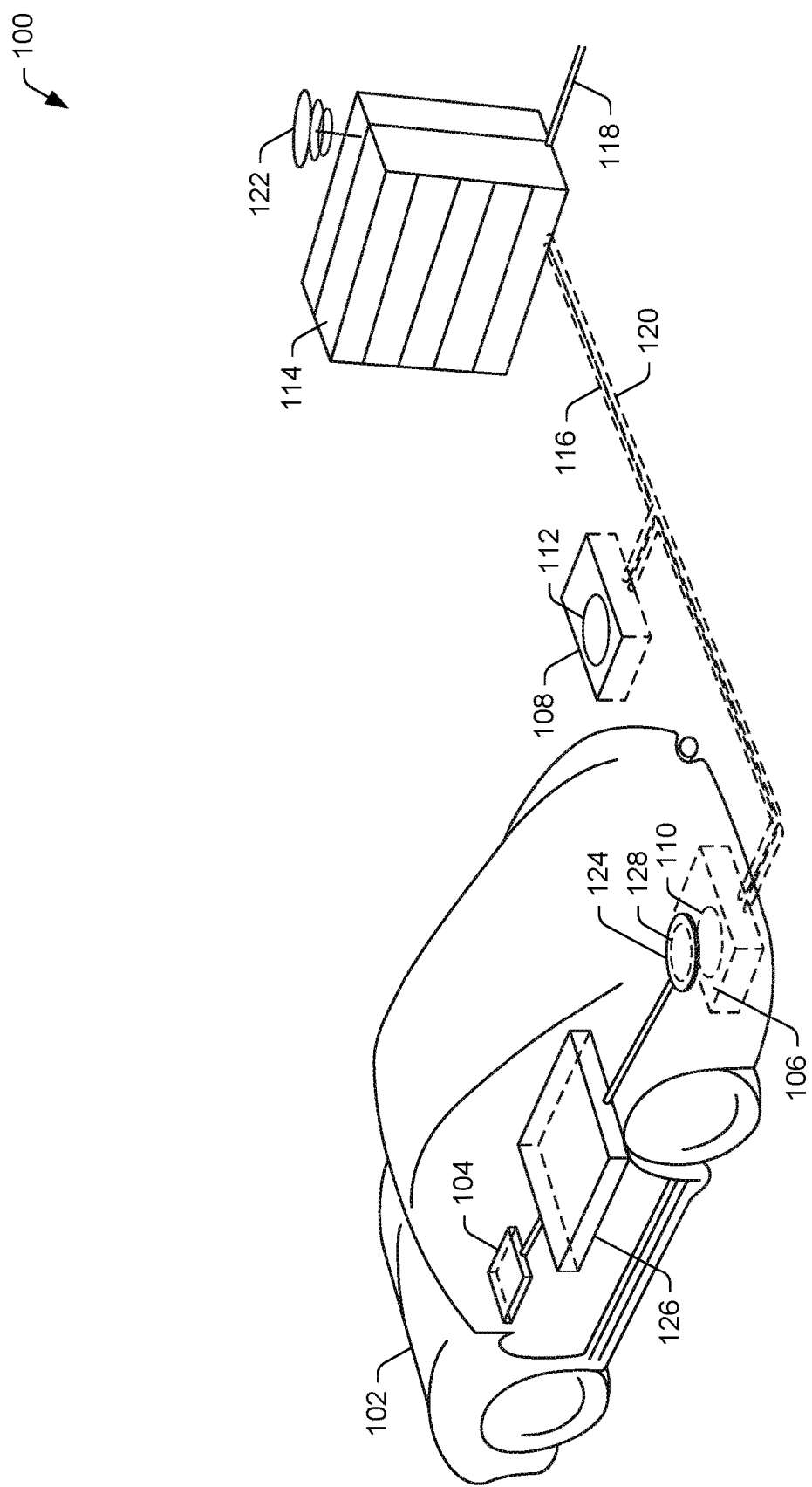
FIG. 1 is a schematic diagram of a wireless power transfer system for charging one or more electric vehicles.

FIG. 1 is a schematic diagram of a wireless power transfer system 100 for charging one or more electric vehicles. The wireless power transfer system 100 enables the delivery of power to an electric vehicle 102. Such a system is also known as a wireless electric vehicle charging (WEVC) system because such systems are typically used to deliver power to charge a battery 104 in the electric vehicle 102. The power need not be delivered to battery 104. Rather, it could be delivered to another load, such as an electric motor or other ancillary in the electric vehicle 102 while it is parked, including a heating system for cold mornings or an air conditioning system for hot days.

As shown, the system 100 allows charging while the electric vehicle 102 is parked in one of two parking spaces, which each have an associated base power-transfer apparatus 106, 108. As will be described in greater detail hereinafter, each base power-transfer apparatus 106, 108 includes a coil 110, 112, which is driven by associated control circuitry (not shown in FIG. 1) to generate a magnetic field above the base power-transfer apparatus 106, 108.

Depending on specific requirements of a given implementation, the control circuitry may be supplied within the base power-transfer apparatus. Alternatively, the control circuitry may be supplied partly or wholly in a unit separate from the base power-transfer apparatus 106, 108, with the base power-transfer apparatus 106, 108 including the coil and minimal base-side control circuitry, if any, that is deemed necessary for efficient driving of the coil 110, 112. The base power-transfer apparatuses 106, 108 are typically installed on the ground surface or buried in the ground, although they may also be supplied as removable units that may simply be placed on the ground where required and moved to another location after use.

A power supply 114 coupled to the base power-transfer apparatuses 106, 108 delivers electrical power to the base power-transfer apparatuses 106, 108 via a power link 116. As shown, the power supply 114 is connected to a power network 118. In a domestic installation, the power supply 114 may be connected to a domestic power supply in place of the power network 118.

In use, the power supply 114 and the base power-transfer apparatuses 106, 108 communicate via a communications link 120, which may be a wired or wireless connection. Alternatively, or additionally depending on the specifics of the installation, communication within the system 100 may be via a wireless link 122. The wireless link 122 may optionally also communicate with, e.g., a power grid management system or other external entity via a communication backhaul to manage and control power transfer from the power grid to the system or vice versa. In the illustrated example, the power link 116 and the communications link 120 may be buried. Alternatively, e.g., in a domestic setting, they may be supplied in the form of a cable or umbilicus of connections that can be plugged into the base power-transfer apparatus 106, 108 and the power supply 114.

The electric vehicle 102 includes a vehicle power-transfer apparatus 124 and associated vehicle-side control circuitry 126 which controls the transfer of energy from a coil 128 in the vehicle power-transfer apparatus 124 to the battery 104. The vehicle-side control circuitry 126 and the base-side control circuitry communicate with each other during the transfer of power between the base power-transfer apparatus 106, 108 and the vehicle power-transfer apparatus 124, as will be described in greater detail herein below.

As shown, the vehicle power-transfer apparatus 124 includes a magnetic coil 128, and the vehicle-side control circuitry 126 is located in a different location on the vehicle 102 than the coil 128. As with the base power-transfer apparatuses 106, 108, this separation of the coil 128 and the control circuitry 126 is a matter of engineering design or selection depending on the specifics of the installation. The control circuitry 126 may be supplied partly or wholly in the vehicle power-transfer apparatus 124 together with the coil 128. In some vehicles it may be more convenient in terms of manufacture or servicing to combine the equipment and the coil 128 in the vehicle power-transfer apparatus 124 whereas, in other vehicles, separate units may be more suitable. Similar considerations apply to the separation or co-location of the control circuitry and the coils 110, 112 in the base power-transfer apparatus 106, 108.

Typically, the vehicle power-transfer apparatus 124 is located under the vehicle 102 near the front or rear of the vehicle 102. The exact location of the vehicle power-transfer apparatus 124 is typically determined when the vehicle 102 is being designed. This determination depends on a wide range of factors associated with the design of the vehicle 102, including the allocation of space to different functional units within the vehicle 102 that may have nothing to do with the WEVC function per se. The position may also depend on the physical size of the vehicle power-transfer apparatus 124, which depends on the amount of energy that the power-transfer apparatus is required to handle. This, in turn, is dependent to some extent on whether the vehicle is a hybrid electric vehicle with both a battery-powered motor and an internal combustion engine, or a (fully) electric vehicle where the only power source is electrical. Conveniently, the vehicle power-transfer apparatus 124 is placed on the vehicle 102 underneath and toward the front or rear of the vehicle 102 to facilitate positioning of the vehicle power-transfer apparatus 124 over the base power-transfer apparatus 106 or 108 during parking of the vehicle 102.

In use, the vehicle 102 is so positioned in a parking space that the vehicle power-transfer apparatus 124 is located over the base power-transfer apparatus 106, 108 in the parking space. When the vehicle 102 is parked as shown, with the vehicle power-transfer apparatus 124 placed over the base power-transfer apparatus 106, 108, wireless power transfer can be employed. Electrical energy in the form of an AC current is delivered from the power supply 114 via the power link 116 to the base power-transfer apparatus 106 where it drives the coil 110. This current causes the coil 110 to create a magnetic field (Ampere's law). That field induces a voltage in the coil 128 in the vehicle power-transfer apparatus 124 (Faraday's law), which creates a current that can be used to drive a load. The current is applied via the control circuitry 126 to charge the battery 104.

It should be appreciated that the system 100 shown in FIG. 1 is a static WEVC system in that the vehicle 102, once parked, remains in place over the base power-transfer apparatus 106, 108 during charging of the battery 104. Other wireless power transfer systems for electric vehicles allow power transfer to occur while the vehicle is being driven along a road, picking up energy from a charging track that serves a similar function to the base power-transfer apparatuses 106, 108. Such dynamic wireless electric vehicle power transfer systems are well documented and, in the interest of brevity, are not described in any further detail herein.

Usually the wireless power transfer system 100 is designed to transfer power from the power supply 114 via the power network 118 to the base power-transfer apparatus 106 or 108, and on to the vehicle power-transfer apparatus 124. However, because of the inherent way in which magnetic wireless power transfer functions, power could also be transferred from the battery in the vehicle to the power network 118. Further description of the operation of the wireless power transfer system 100 focuses on power transfer from the power supply 114 to the electric vehicle 102. It should, however, be noted while considering the following description that power transfer may also happen in the reverse direction. That is to say, power may be delivered from the battery 104 in the electric vehicle 102 via the wireless power transfer units to the power supply 114 and out to the power network 118.

Figure 2:
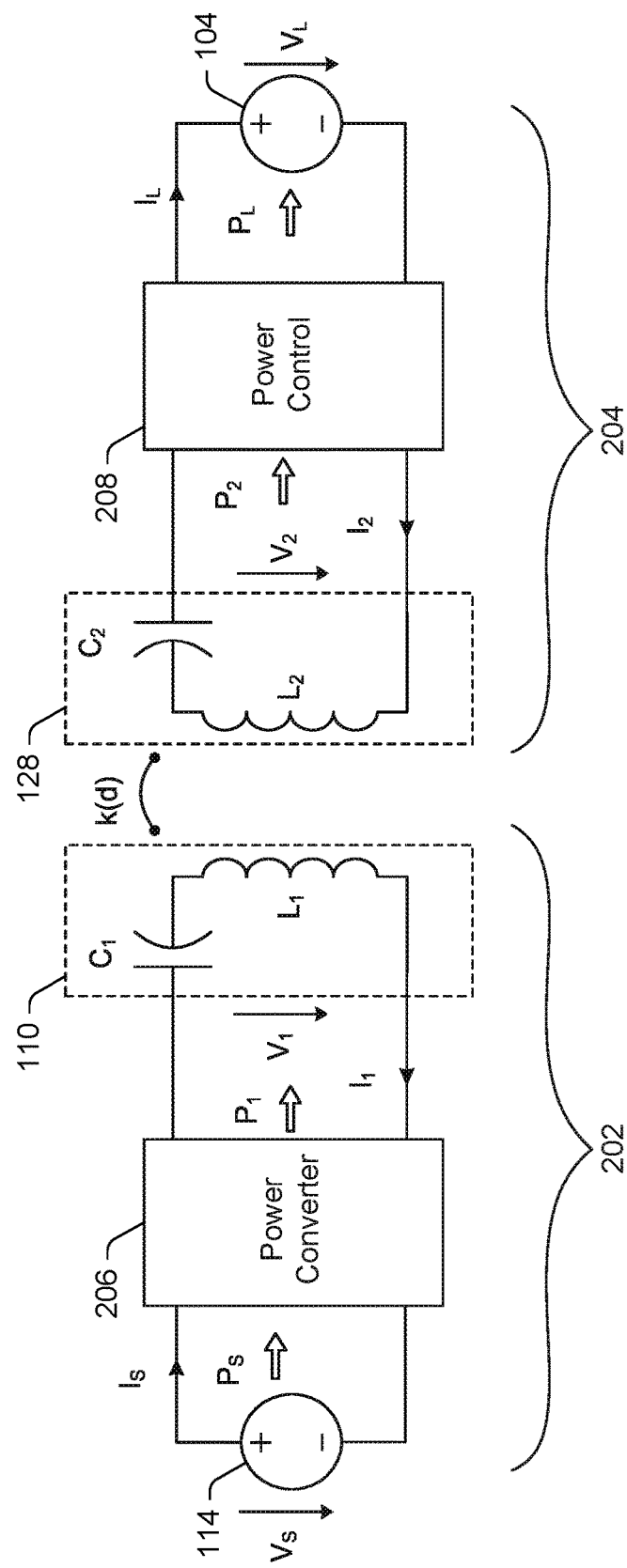
FIG. 2 is a schematic diagram of electrical elements of the wireless power transfer system of FIG. 1.

FIG. 2 is a schematic diagram of electrical elements of the wireless power transfer system of FIG. 1. Electrically, the wireless power transfer system (now renumbered as 200) comprises base-side circuitry 202 from the power supply 114 to the base-side coil 110, and vehicle-side circuitry 204 from the vehicle-side coil 128 to a load (e.g., the battery 104). The base-side circuitry 202 operates to convert energy from the power supply 114 into a suitable form to drive the base-side coil 110. The vehicle-side circuitry 204 operates to control the application of energy received by the vehicle-side coil 128 to the vehicle's battery 104.

Electrically, the base-side coil 110 is represented by inductor $L_1$ and capacitor $C_1$. The capacitor $C_1$ in series with the coil $L_1$ (as shown) or in parallel creates an LC circuit that resonates at a given frequency. This resonance helps to optimize power transfer between the coils. Values of L and C are selected with the operating frequency of the WEVC system in mind. Similarly, the vehicle-side coil 128 is represented by inductor $L_2$ and capacitor $C_2$ with values again chosen, among other things, to achieve resonance at the operating frequency.

The power supply 114 supplies AC power $P_s$ to a power converter 206. The AC power may be supplied at local voltage levels V, (e.g., domestic levels of 110 V at 60 Hz in the U.S. and 220 V at 50 Hz in Europe, or industrial levels and polyphase supplies for higher power implementations). The power converter 206 converts the incoming AC power to a power signal $P_1$ running at a system voltage $V_1$ and frequency to drive the base-side coil 110. This may be achieved by first converting the signal from the power supply $P_s$ into a direct current (DC) signal and then using a converter such as an H-bridge (not shown) to convert the DC signal into the power signal $P_1$ for the coil 110. Currently, WEVC systems are being standardized or operated at an operating frequency of 85 kHz. The power converter 206 ensures that the output power signal $P_1$ is tuned and matched to the base-side coil 110. Among other things this tuning and matching aims to optimize the efficiency at which power is transferred from the power supply 114 to the base-side coil 110. The power signal has an associated current $I_1$ that flows in the coil 110. This current $I_1$ causes the coil to create a magnetic field.

In use, when the base-side coil 110 and the vehicle-side coil 128 are in close proximity (e.g., the electric vehicle is parked with the coils 110, 128 aligned and separated by an air gap of distance d) the magnetic field generated by the base-side coil 110 couples with the vehicle-side coil 128, as represented by k(d), the coupling factor at distance d. The magnetic field induces a voltage $V_2$ in the coil in the vehicle power-transfer apparatus 124 which creates a power signal $P_2$ including a current $I_2$. The current $I_2$ in the power signal $P_2$ is received by a vehicle-side power control 208, which includes tuning and matching circuitry and power conversion circuitry that converts the current $I_2$ into a form suitable for the battery 104, e.g., DC current.

As for the form of the coil (e.g., base-side coil 110, vehicle-side coil 128), there are numerous configurations and topologies available for use. These include such single coil arrangements as a circular, square, or polygonal where the coils are wound in a substantially planar form. The coil configurations and topologies also include solenoid arrangements, in which the coil is wound around a core, and bipolar arrangements, which use a coil arrangement that achieves virtually zero coupling between different parts of the coil. Additional coil configurations and topologies include multi-coil arrangements, such as a double-D ("DD") coil where the conductor follows a convoluted path that is shaped like two letters "D" alongside each other. The D-shaped portions define pole areas in the coil that allow magnetic flux to be generated at a height above the coil where flux arches from one coil opening to the other coil opening (e.g., in an aspect horizontally polarized). Hybrid combinations of these are also available. Each configuration and topology offers advantages and disadvantages, and the decision of which to use depends on the application for which the system is designed.

Different applications of wireless power transfer are designed to fulfill different operating conditions. Whether the operating frequency of the system 200 is chosen first and values of the capacitor $C_1$ and the inductor $L_1$ are selected accordingly, or whether it the values of the capacitor $C_1$ and the inductor $L_1$ are chosen first and the operating frequency is selected accordingly is, in practice, an engineering decision. However, if the operating frequency becomes standardized at the aforementioned 85 kHz, that may become one governing value in designing the coil 110, 128.

Depending on the market, the equipment for the vehicle 102—e.g., the vehicle power-transfer apparatus 124 and the vehicle-side control circuitry 126, and the equipment for the base (e.g., the base power-transfer apparatus 106, the coil 110, and the power supply 114) may be made and sold by different vendors to different customers. The vehicle equipment may be sold to automobile manufacturers for incorporation into the mass-production of an electric vehicle. Or, it may be sold directly to electric vehicle owners as an after-market option. Similarly, the base equipment may be supplied to automobile manufacturers for sale with a new electric vehicle or it may be made and sold directly to electric vehicle owners. Ongoing standardization efforts are directed, among other things, to ensuring interoperability of differently designed WEVC systems. The aim is for a vehicle from any automobile manufacturer to be able to work with base equipment from any other supplier, be they automobile manufacturers or others. These factors too need to be taken into account when designing a WEVC system for sale to customers, be they other companies or the public.

Space is also a consideration. In some applications, e.g., the apparatus in a WEVC system, and despite the relatively high power levels involved, there is a desire to make the coils as small as possible in order not to take up large areas in parking spaces and not to add weight or take up space under the vehicle. It is simpler to design a coil where the loops are laid out in a single layer, with all the loops substantially in one plane. However, as power levels increase, the size of the coil necessary to handle the higher currents similarly increases. The size of the base power-transfer apparatus 106 is limited by the size of the vehicle 102—it cannot extend outside the footprint of vehicles that may park in the space. The size of the vehicle power-transfer apparatus 124 is similarly limited, but it is also constrained by other parts underneath the vehicle 102—the vehicle power-transfer apparatus 124 cannot interfere with the vehicle's suspension and steering, for example. Space on a modern vehicle is at a premium, with numerous components competing to occupy locations within the envelop of vehicle.

Coil topologies have therefore been proposed aimed at, among other things, achieving a compact base or vehicle power-transfer apparatus design. US2010/0109604 describes an inductive power transfer pad comprising a coil having at least one turn and preferably a plurality of turns of a conductor, which coil may be positioned to wind around a central point. US2012/0025602 describes among other things a magnetic flux pad including two pole areas defined by coils which may be spiral wound and may be in the same plane. US2012/0025603 describes inter alia a magnetic flux pad in which a coil, which may comprise a plurality of coils, is wound around a core. US2014/0111151 describes coil configurations where an inductor circuit is used to reduce current difference between different strands of the coils. US 2015/0170833 describes various coil topologies, including some in which the coil has plural layers.

The frequency at which WEVC systems are designed to operate (e.g., the 85 kHz frequency mentioned above) can lead to an undesirable effect known as the skin effect. This is the tendency of an alternating electric current (AC) to become distributed within a conductor such that the current density is largest near the surface of the conductor, and decreases with greater depths in the conductor. The electric current flows mainly at the "skin" of the conductor, between the outer surface and a level called the skin depth. The skin effect causes the effective resistance of the conductor to increase at higher frequencies where the skin depth is smaller, thus reducing the effective cross-section of the conductor.

In many wireless power transfer applications, it is common to use Litz wire as the conductor forming the coil. Litz wire consists of many thin wire strands, individually insulated and twisted or woven together, and with groups of twisted wires being further twisted together in a prescribed pattern. This structure is configured to mitigate skin effects and also usually allows conductors of smaller diameter to be used than would otherwise be possible. Thus, although the coil is primarily an inductor L, it is made from a conductor that has an inherent resistance and inter-strand capacitance, with the turns of the coil also creating inter-turn capacitance. These inherent characteristics of the conductor contribute to the values of L and C in the base- and vehicle-side coils 110, 128. In some circumstances, the inherent capacitance may be sufficient to provide the required capacitance without the need for separate components or elements. In other design situations, separate capacitors or other discrete components may prove necessary.

Generally, the greater the current that the conductor is required to carry, the thicker the diameter of the Litz wire. Since the Litz wire is made of multiple bundles of twisted wires that are themselves twisted together, the Litz wire becomes less flexible with increased thickness. The levels of current that a WEVC coil is required to carry dictates the use of Litz wire with a given diameter. The exact diameter depends on the desired operating characteristics of the WEVC system. For example, to give a sense of the sizes involved, a coil in a 7 kW system may require the use of Litz wire with a diameter of around 10 mm. Larger or smaller diameters may be suitable depending on the power requirements of a given implementation.

This thickness makes it difficult to bend the wire into tight curves which in turn limits how small the coil can be made in practice. One way of overcoming this is to use two or more lengths of Litz wire coupled electrically in parallel to form the coil. The use of plural lengths of Litz wire allows smaller diameter wires to be used which are more flexible and, thus more readily formable into tighter curves than the thicker single length of wire. The total current-carrying capacity is shared between the plural conductors.

The Litz wire or other conductor may be part of a coil structure that may include a layer of ferrite or other magnetically-permeable material and a conductive backing plate. The permeable layer and the backing plate interact with the conductors and serve to guide the magnetic field in a desired direction.

As with any transfer of energy, high efficiency is a desirable attribute. An imbalance may have an adverse effect on the apparatus as components age faster, reducing reliability and the useful life of the apparatus. Energy lost during operation of a wireless power transfer apparatus leads to greater operating costs. The lost energy may also cause heating of the apparatus which, in the extreme and depending on the level of power transferred, may create a fire hazard or other safety concerns.

Figure 3:
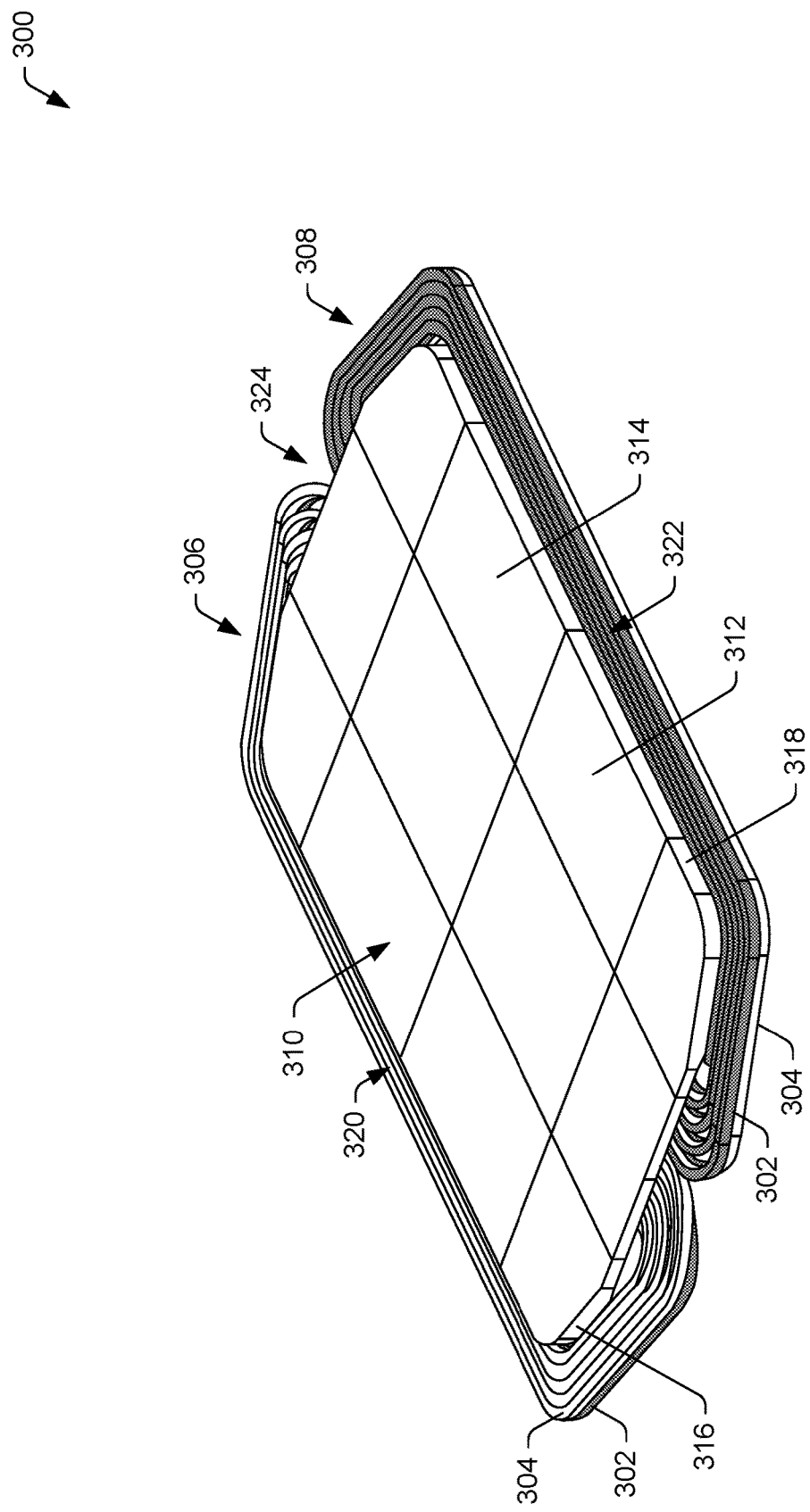
FIG. 3 is a schematic perspective view of a double-D coil.

FIG. 3 is a schematic perspective view of a double-D coil 300 comprising plural conducting elements, such as conductors 302, 304. In the drawing, the elements are distinguished by one conducting element (e.g., conductor 302) illustrated with shading and the other conducting element (e.g., conductor 304) illustrated with no shading. Litz wire is used as the conducting elements in many implementations. The use of plural lengths of Litz wire in parallel like this allows wires with smaller diameters to be used than would be the case if a single length were used, e.g., 4-5 mm as compared to 10 mm. These conductors 302, 304 may be referred to as 'filars,' but herein they are simply referred to as 'conductors' or 'conducting elements.' The conductors 302, 304 are wound to form first and second loops 306, 308 on a layer 310 of ferrite or other magnetically-permeable material. Thus, each of the conductors 302, 304 behaves as an inductor with inductance and resistance. The conductors 302, 304 are electrically coupled at their ends. That is to say, the inductors formed thereby are electrically coupled in parallel, and they are 'seen' electrically as a single inductor that may be used as the inductor $L_1$ and/or $L_2$ shown in FIG. 2.

As illustrated in FIG. 3, a number of ferrite tiles, e.g., tiles 312 and 314, together form the permeable layer 310. Magnetically-permeable materials such as ferrite tend to be brittle and the choice of how to construct the layer can affect its durability. The layer 310 may be formed using a combination of any suitable number of tiles from a single tile to multiple tiles as shown. In this way, the layer 310 of magnetically-permeable material is polygonal and has a periphery. The permeable layer 310 serves as a flux path to confine or guide the magnetic field created in use by current flowing through the conductors 302, 304.

The permeable layer 310 may be of substantially uniform thickness. In some aspects, however, the thickness of the permeable layer may be non-uniform, such that one area is thicker than another area. An example of non-uniform thickness is illustrated in FIG. 3, in which the permeable layer 310 (e.g., ferrite) is thicker at its outer edges 316, 318, corresponding to distal portions 320, 322 (e.g., outer portions of the loops 306, 308 that are farthest away from one another in the DD configuration) of the loops 306, 308. The outer portions of each of the loops 306, 308 extend outside of the outer edges 316, 318 of the permeable layer 310. This configuration allows a central region 324 (e.g., where a portion of the loop 306 is adjacent to a portion of the loop 308) of the loops 306, 308 to be supported by the permeable layer 310 and the distal portions 320, 322 to extend beyond the outer edges 316, 318 of the permeable layer 310. The loops 306, 308 could, of course, be placed differently relative to the permeable layer 310 with greater, lesser, or even no extension beyond the outer edges 316, 318 of the permeable layer 310. The thickness of the permeable layer 310 may be uniform thickness in a lengthwise direction along the permeable layer 310. It should be further appreciated that the stacking of the conductors beyond the outer edges 316, 318 may extend into the plane of the permeable layer 310.

In FIG. 3 the coil 300 is shown with the first and second loops 306, 308 positioned below the permeable layer 310. In this orientation the coil 300 is suitable for placement on the underside a vehicle (not shown in FIG. 3) with the permeable layer 310 above the loops 306, 308. The ferrite or permeable layer serves as a flux path above (as illustrated) the coil 300 causing the magnetic field to be projected below the coil 300. It will be appreciated by those possessed of the appropriate skills that the coil 300 could equally be oriented the opposite way, such that the loops 306, 308 are positioned above the permeable layer 310. In this other orientation, the coil 300 is suitable for placement in a ground power-transfer apparatus with the permeable layer 310 below the loops 306, 308. In aspects, the coil 300—and this is true of all of the coils described herein—may be used in the base or ground power-transfer apparatus (e.g., the base power-transfer apparatus 106, 108 shown in FIG. 1) or in the vehicle power-transfer apparatus (e.g., the coil 128 shown in FIG. 1). It follows from this that such terms as 'upper,' 'lower,' 'above' and 'below' are merely relative terms that describe the position of elements in the coil 300—and the other coils described herein—in relation to each other in the drawings rather than in use.

One of the challenges of using plural conductors 302, 304 in parallel is achieving a balance between the two loops 306, 308. Laying two conductors alongside each other in spiral paths typically results in the conductor that starts at the outside of the spiral being longer than the conductor on the inside of the spiral. These differences can lead to a significant imbalance in inductance. For example, in tests, a double-D coil constructed using plural conductors was found to have an inductance of 37.2 µH in one of its conductors and 47.1 µH in the other of its conductors. The differences cause an imbalance in the coil, affecting its behavior when it is used in a WEVC system on either or both the base side and the vehicle side. A 5% difference in inductances may lead to a difference of up to a 60% to 40% ratio in the current flowing through the conductors during operation. For example, if the total current in the coil is e.g., 100 A, then a current in one conductor is 40 A and the current in the other conductor is 60 A. This imbalance may cause overheating and lead to faster aging of the insulation in the Litz wire.

Figure 4:
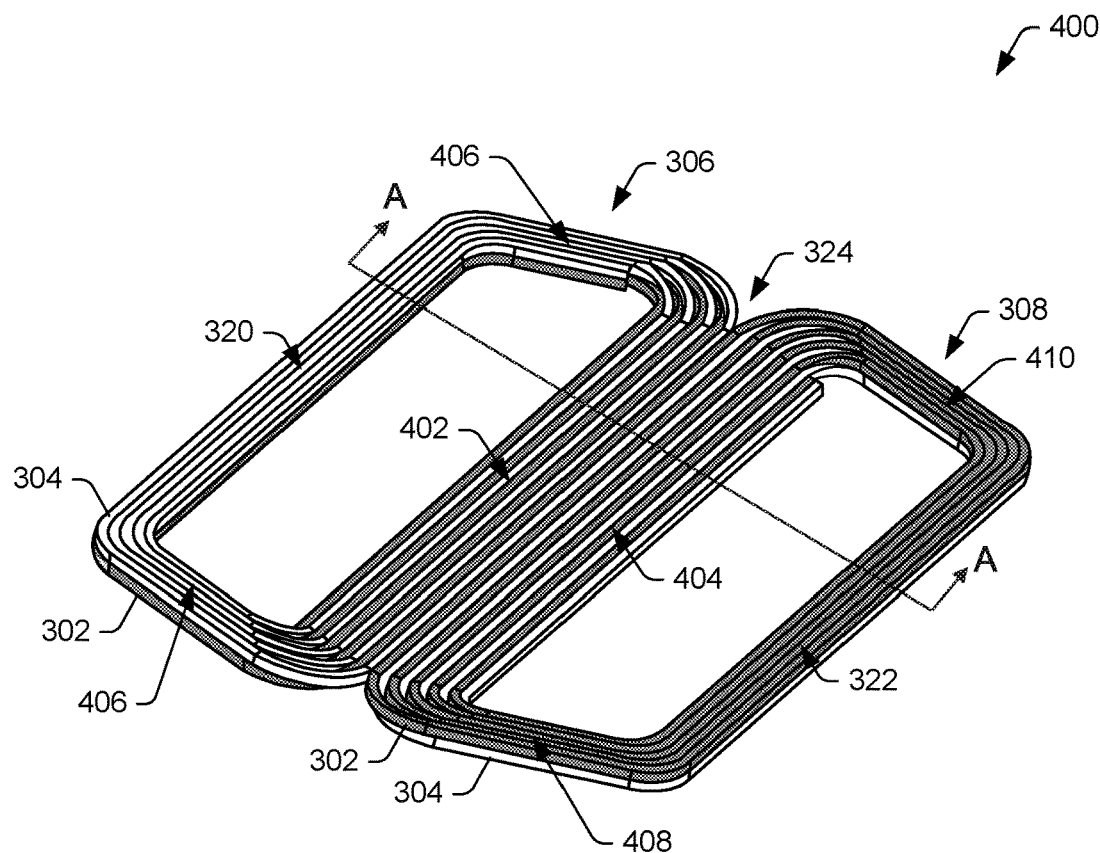
FIG. 4 is a schematic perspective view of conducting elements in the coil of FIG. 3.

FIG. 4 illustrates a perspective view of a double-D coil 400, which is an instance of the coil 300 from FIG. 3. As illustrated, the conductors 302, 304 each follow a convoluted path that defines the shape of the first and second loops 306, 308. The coil 400 is arranged in the above-mentioned DD or double-D configuration. Each of the loops 306, 308 comprises a proximate portion, also referred to as a "middle portion" (e.g., proximate portion 402 of the loop 306 is adjacent or proximate to proximate portion 404 of the loop 308) in the central region 324 and a distal portion (e.g., the distal portions 320, 322, which are located on opposing sides of the pole areas, corresponding to coil openings or "windows"). The conductors 302, 304 may be formed by a single coil having a plurality of turns and wound for enclose a first opening and a second opening adjacent to the first opening. In aspects, a second coil may also have a plurality of turns and be wound to enclose the first and second openings. In use, this double-D configuration creates a flux pipe which extends from an area within one of the loops 306, 308, above the coil 400 to an area within the other of the loops 306, 308. Where the coil 400 is used in a base power-transfer apparatus, the flux pipe contains a volume or space above the coil where the magnetic field is greatest, e.g., where the transmitted magnetic field is at its densest. Where the coil 400 is used in a vehicle power-transfer apparatus, the flux pipe contains a volume or space where the coil is most sensitive to receiving energy from a magnetic field.

Figure 5:
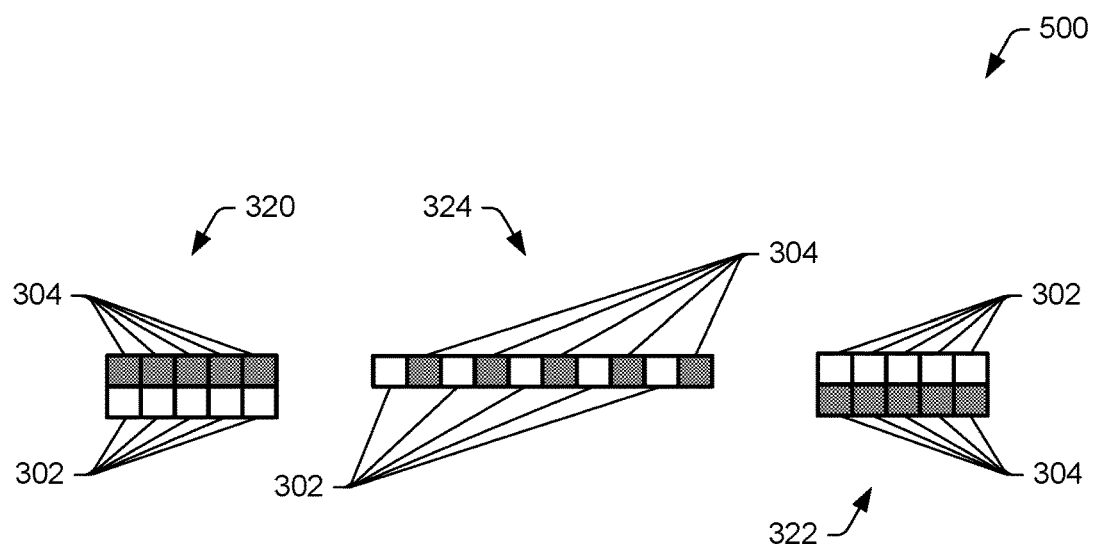
FIG. 5 is a sectional view of the conducting elements of FIG. 4.

A cross-section view 500 along the line A-A in FIG. 4 is shown in FIG. 5. As may be seen more clearly from further consideration of FIG. 4 and FIG. 5 together, in the central region 324 the conductors 302, 304 are laid side-by side alternating between one conductor and the other. In the distal portion 320, 322 of each loop 306, 308, the conductors 302, 304 are stacked, e.g., coil turns or portions are placed one above the other in layers, as can be seen in left and right sections of FIG. 5. The conductors 302, 304 may be stacked in at least two layers along at least a portion of the periphery of the layer of magnetically-permeable material.

Side portions 406, 408, 410, 412 of the loops 306, 308 between the proximate portions 402, 404 and the distal portions 320, 322 may be laid out side-by-side as per the central region 324 or stacked in layers as per the distal portions 320, 322. In FIG. 4, the conductors 302, 304 are stacked as layers in the side portions 406, 408, 410, 412. FIG. 5 also shows that in the distal portion 320 of the loop 306, the conductor 304 is layered or stacked above the conductor 302, whereas in the distal portion 322 of the loop 308, the conductor 304 is layered or stacked below the conductor 302. In an alternative implementation, the conductor 302 could be stacked above the conductor 304 in the distal portion 320 and below the conductor 304 in the distal portion 322. Stacking the conductors 302, 304 further enables a coil to be designed that occupies a smaller volume than would otherwise be the case. In addition, in the middle portions of the loops 306, 308, the conductor 302 includes turn portions that are interleaved with turn portions of the conductor 304.

Symmetry in the structure of a coil is desirable to reduce the above-mentioned inductive imbalance. In practice there may be some asymmetry, among other things, because of the need to feed the conductors into the coil's structure. However, stacking, in addition to reducing the volume occupied by a coil, also allows a route to be defined for each conductor 302, 304 where each conductor interacts to substantially the same degree with the permeable layer 310 along the entirety of their respective lengths. This may be achieved by forming routes that mirror each other to the extent possible with the aim of ensuring that the total distance of each conductor along its length from the ferrite or permeable layer 310 is substantially the same. In aspects, stacking the coils causes the flux path of each conductor 302, 304 through the permeable layer 310 to be similar and, ideally, to be substantially the same.

A coil turn or portion that has only one adjacent turn or portion is less able to direct magnetic flux in the required direction. In addition to enabling a more compact coil structure, stacking results in fewer turns that are only adjacent one other turn. The exact manner of the stacking depends on various factors including the shape of the conductors. Square conductors, as shown, lend themselves to one conductor turn being stacked directly above another. Conductors having a circular cross section may have turns in one layer in a recess between adjacent turns in another layer.

In following convoluted paths, the conductors may have various turns and bends of varying radii. The radius of a bend on an outer turn of a turn may be larger than that of an inner turn. Each bend may create a flux hot spot, e.g., an area where the density of the magnetic field is greater than the density along a straighter portion of the conductor. The tighter the bend, the denser the hot spot. These hot spots result in an increase in the inductance of the conductor. Making the path of one conductor substantially symmetrical to the extent possible with that of the other conductor, e.g., by layered stacking in the manner shown in FIG. 5, makes the total radii along each coil substantially equal. This stacking causes the flux path of each conductor 302, 304 to be similar and, ideally, to be substantially the same, regardless of whether a permeable layer 310 is present. This helps to create balance in the inductance of the conductors 302, 304 and of the two loops 306, 308 of the coil 400.

As illustrated in FIGS. 3-5, the conductor 304 is closest to the ferrite or permeable layer 310 in the loop 306 and furthest from the permeable layer 310 in loop 308. Forming conductor paths in which the total distance of the conductor 302, 304 to the layer 310 along its length is substantially the same for both conductors means that both conductors 302, 304 are affected by the permeable layer 310 in the same way. That is to say, by winding the conductors 302, 304 in this way, the overall proximity (e.g., average distance) of the conductors 302, 304 (and of the loops 306, 308) to the permeable layer 310 along their lengths is substantially the same. This results in the flux paths of the conductors 302, 304 being the same. Consequently, the conductors 302, 304 and the loop 306, 308 are both affected to the same degree by the permeable layer 310 in the generation of the magnetic field in a base power-transfer apparatus and in the collection of magnetic flux in a vehicle power-transfer apparatus. Consequently, the inductance in one of the loops (e.g., loop 306) may be substantially the same as that in the other of the loops (e.g., loop 308). The coil 400 is therefore more balanced electrically that it would otherwise be. Tests on a coil constructed in this way have shown a balance to the extent that both inductances were within 1% of 39 µH, a considerable improvement and well within typical engineering tolerances.

FIG. 5 shows the conductors 302, 304 as having a square cross-section. This readily enables them to be stacked in the manner shown. The conductors 302, 304 may be formed using Litz wire, although other suitable conductors may be used. Litz wire is available in a range of different shapes and sizes, including circular and square cross-sections. Whether Litz wire is used and whether a given size or cross-section is chosen depends on specific requirements of a given system. It may also have an effect on the way in which the coils are layered one above the other. Where conductors of, say, a circular cross-section are used, it may be better to allow loops of one layer to sit in the recess between loops in the lower layer, this being the position that conductors of circular cross-section naturally tend to adopt. Although the above description is given with reference to a coil comprising two conductors, it should be appreciated by those possessed of the relevant skills that more than two conductors may be used to form the coil. Any suitable number of conductors may be used if the conductors are wound in such a manner that they all interact with the ferrite in substantially the same way.

In aspects, a coil, such as coil 400, can be built with a backing plate of aluminum or other conductive material. In order to keep the drawings simple, the backing plate is not shown. Such a plate would be placed on the other side of the permeable layer 310 from the conductors 302, 304, e.g., on the top of the coil 300 in the orientation shown in FIG. 3. The backing plate may be of a comparable size to that of the permeable layer 310, having a slightly larger footprint than the ferrite, and may be positioned in parallel to the permeable layer. The conductive plate serves to repel magnetic flux, which helps to ensure that a magnetic field is only produced on the side of the coil where the conductors are placed, e.g., below the coil 300 in the orientation shown in FIG. 3. It follows that the conductors 302, 304 also interact with the backing plate, and that too may have an effect on the inductance in the coil 300.

In most cases, since the backing plate and the permeable layer are parallel to each other, the overall proximity of the conductors to the backing plate may be equal to the extent that their overall proximity to the ferrite is equal. However, if there is a difference between the footprints of the permeable layer and of the backing layer, it may be wise also to take into account the overall proximity of the conductors to the backing plate.

At a more basic level, an aim is to build a coil with plural conductors laid out in such a way that, despite the conductors 302, 304 following different convoluted paths, the conductors 302, 304 have substantially equal inductance. This may be achieved by winding the conductors 302, 304 such that the overall proximity (or average proximity) of the conductors 302, 304 along their lengths to the ferrite (or other magnetically-permeable material) on which they are formed is substantially equal. This approach may be applied to other coil configurations and topologies. It may also be achieved with or without interaction with a magnetically-permeable material by choosing conductor routes in which the total radii along each conductor is substantially the same. Additionally, a balanced inductance may be achieved, with or without interaction with a magnetically-permeable material, by equal stacking of the coils, e.g., laying the coils out in similar form (preferably as close as practical to identical) with the same number of turns. In each case, the effect of selecting overall characteristics of each path to be substantially the same forces the magnetic flux along similar flux paths and results in the inductance of the plural conductors being substantially equal.

Figure 6:
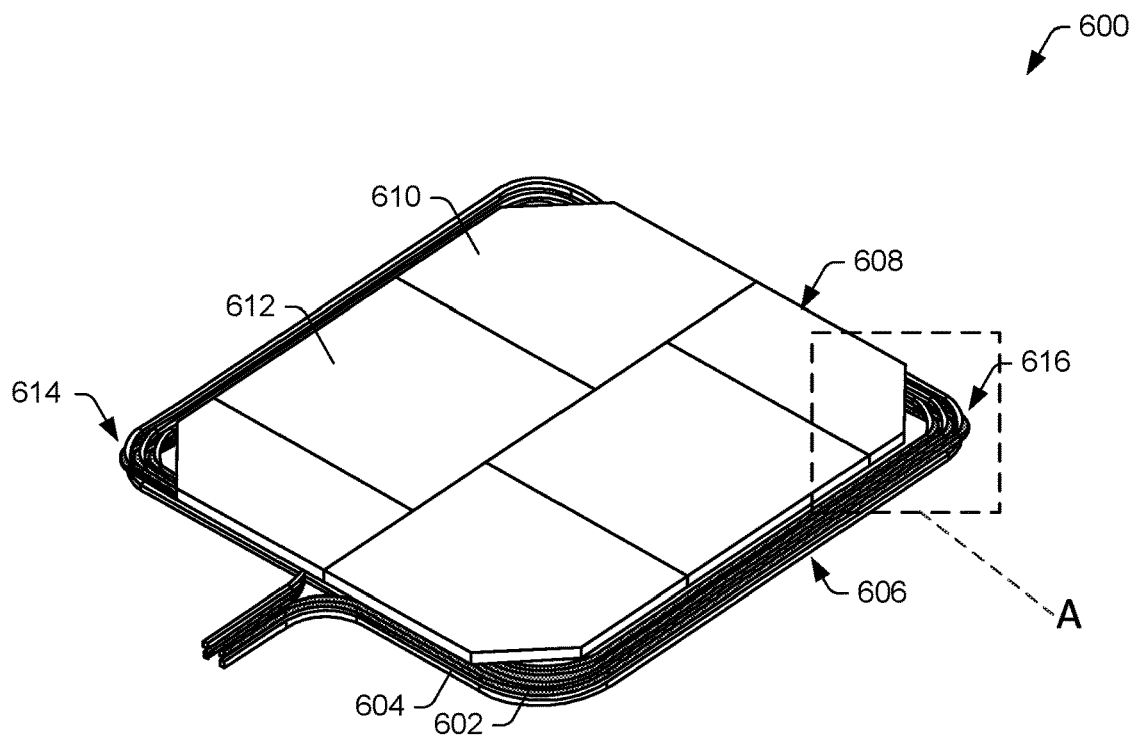
FIG. 6 is a schematic perspective view of a rectangular coil.
Figure 7:
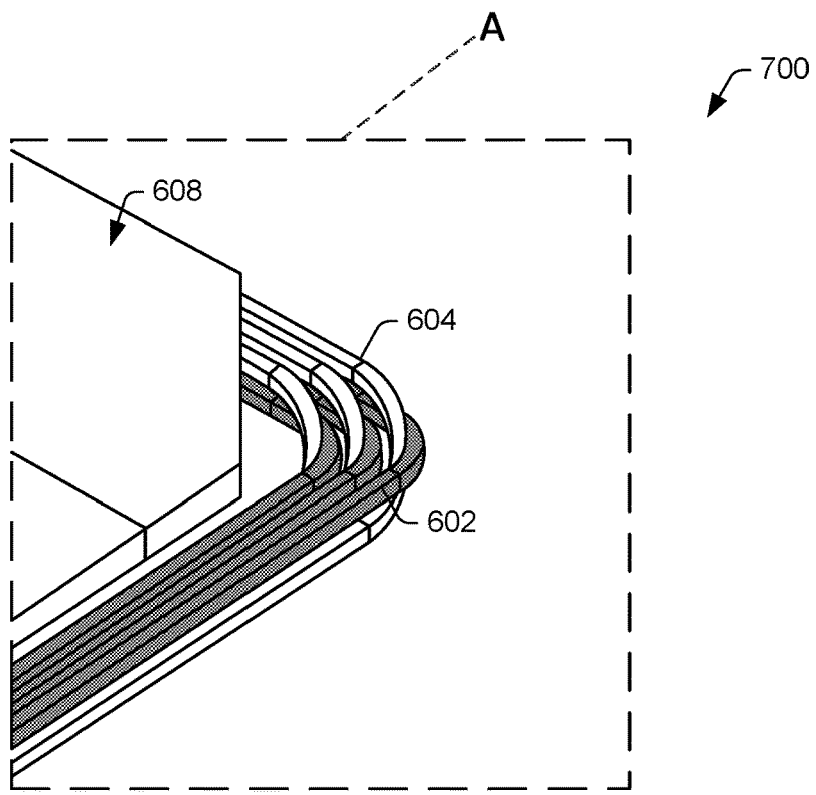
FIG. 7 is a schematic detail perspective view of a corner in area A of the coil in FIG. 6.

Referring now to FIG. 6 and FIG. 7, a square coil 600 comprises plural conducting elements 602, 604 formed as a loop 606 about a layer 608 of ferrite or other magnetically-permeable material. The conducting elements are distinguished form each other in these drawings by one conducting element 602 illustrated with shading and the other conducting element 604 illustrated with no shading. The permeable layer 608 (e.g., ferrite) may be constructed from a single tile or, as shown, multiple tiles 610, 612 of magnetically-permeable material.

In the arrangement illustrated in FIG. 6 and FIG. 7, the two conducting elements 602, 604 are placed one above the other (stacked relative to each other) around the periphery of the coil 600. As can be seen more clearly in the expanded view 700 of FIG. 7, the conducting elements 602, 604 transition between upper and lower paths at diagonally opposite corners 614, 616 of the coil 600. It should be apparent to those possessed of the relevant skills that the conductors need only be stacked sufficiently to ensure that the two conducting elements 602, 604 are of substantially equal distance along their lengths from the layer 608. The transitions between upper and lower positions need not occur at the corners of the coil 600 but can be located in any suitable location along the path followed by the two conducting elements 602, 604. Any suitable number of transitions may be used to achieve the desired outcome of substantially uniform proximity along the length of each of the conducting elements 602, 604 to the permeable layer 608. Moreover, the use of a square shape for the power-transfer apparatus is optional. The coil 600 may be circular or polygonal, with the form of the ferrite or permeable layer 608, and the path of the conductors and the transitions adapted accordingly.

Figure 8:
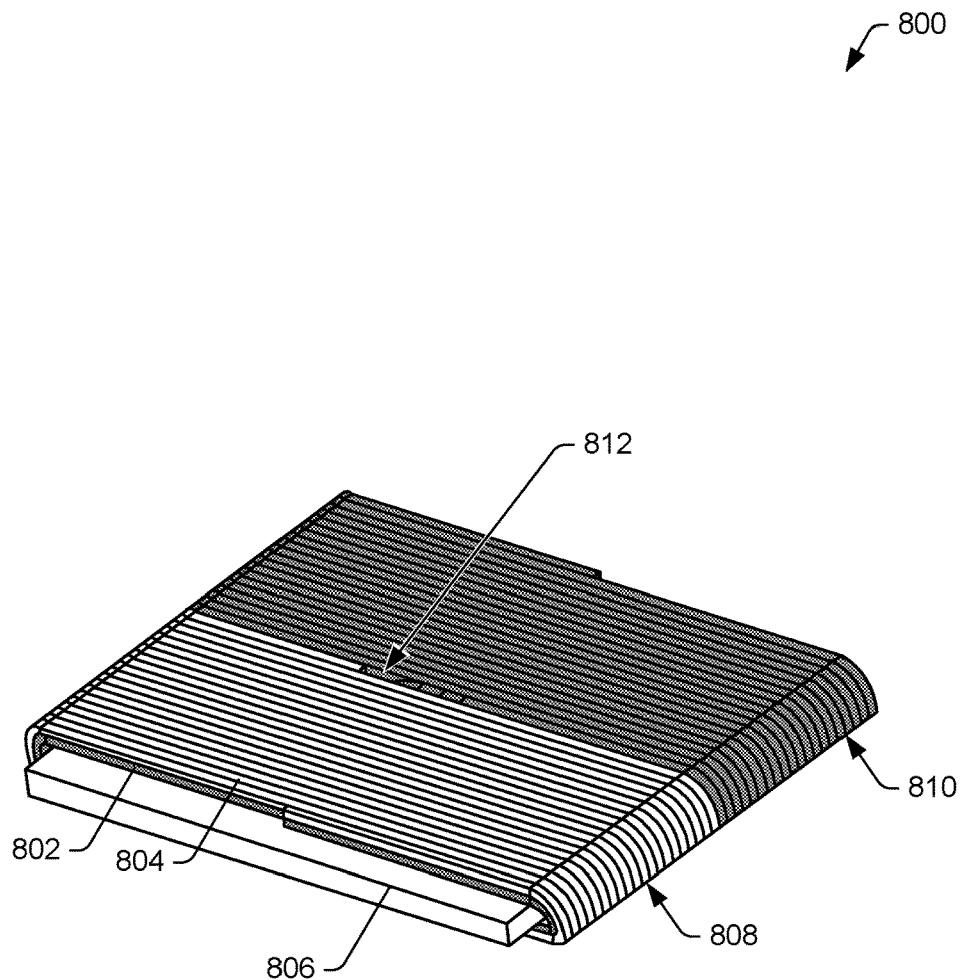
FIG. 8 is a schematic perspective view of a solenoid.

FIG. 8 illustrates an example solenoid 800 coil configuration. The solenoid 800 comprises a first conducting element 802, a second conducting element 804, and a planar layer 806 of magnetically-permeable material, such as ferrite. The planar layer 806 of ferrite or magnetically-permeable material serves as a core around which the first and second conducting elements 802, 804 are wrapped. The conducting elements 802, 804 are distinguished from each other in these drawings by the first conducting element 802 represented by shading and the second conducting element 804 having no shading. The conducting elements 802, 804 are wound around the core (e.g., planar layer 806) such that in a first portion 808 of the solenoid 800, the first conducting element 802 is closest to the core and the second conducting element 804 is furthest from the core. In a second portion 810 of the solenoid 800, the positions of the conducting elements 802, 804 are reversed: the first conducting element 802 is furthest from the planar layer 806 of magnetically-permeable material and the second conducting element 804 is closest to the planar layer 806. Transition(s) 812 between closer and further conductor windings are made where the first and second portions 808, 810 meet in the middle of the solenoid 800.

It should be appreciated from the foregoing description that other winding patterns are possible. For example, the pattern of one conductor being closest to the permeable layer in one portion and the second conductor being closest in the next portion may be repeated along the length of the core. Naturally, this variation in pattern applies to the other coils described herein, if the pattern achieves a substantially balanced degree of interaction between the conductors and the magnetically-permeable material of the core. Put another way, the aim is to achieve equal flux paths for each conductor to give substantially equal inductances in both conducting elements 802, 804.

Other forms of solenoid are possible while still achieving the aim of conducting elements that are substantially equidistant from the core along their lengths. The core need not be a planar slab; it could be cylindrical or any other form suitable for supporting conductors in a solenoid-type coil. The transition(s) need not occur in a central region. The transition(s) can be located elsewhere along the length of the solenoid 800; any suitable location that allows a substantial balance between the overall distance of each conductor and the core to be realized.

Figure 9:
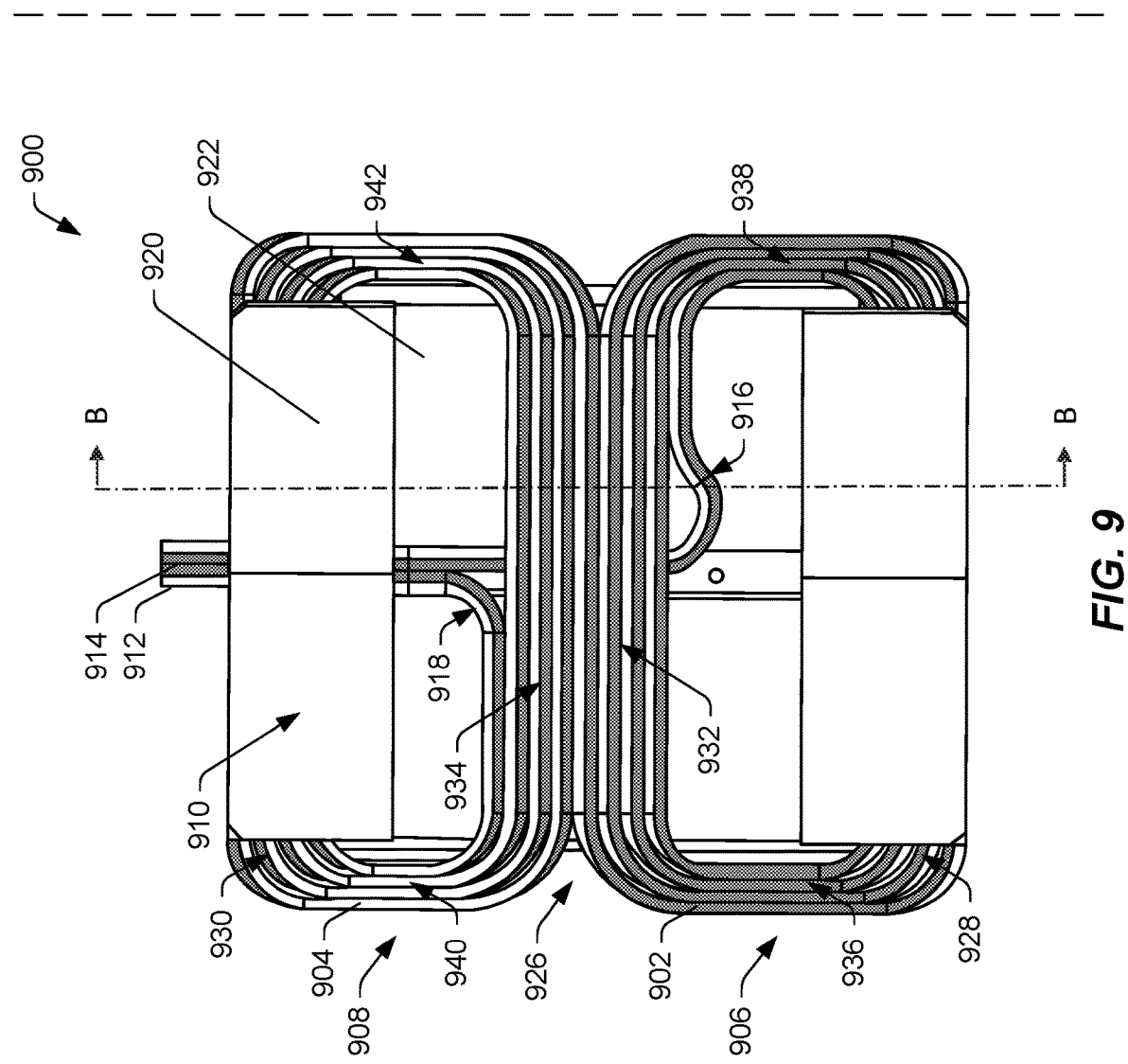
FIG. 9 is a plan view of a hybrid double-D solenoid.

Turning now to FIG. 9, an example DD-solenoid hybrid coil 900 comprises plural conducting elements 902, 904. In the illustrated example, the conducting elements 902, 904 are distinguished by one conducting element 902 illustrated with shading and the other conducting element 904 illustrated with no shading. The conducting elements 902, 904 are wound to form first and second loops 906, 908 on a layer 910 of magnetically-permeable material, such as ferrite.

As illustrated in FIG. 9, the conducting elements 902, 904 have ends that form leads or tails 912, 914 extending from the first and second loops 906, 908 to outside the coil 900. These tails 912, 914 are used to couple the coil 900 to associated control circuitry, such as that shown in and described with reference to FIG. 2. The conducting elements 902, 904 may be of the same length to help ensure balance between the conducting elements 902, 904 and thus between the two loops 906, 908 of the coil 900. Differences in the lengths of the tails 912, 914, due to different lengths of the paths followed by the conducting elements 902, 904, may be accounted for by an additional curve 916, 918 or curves in the paths followed by the conducting elements 902, 904. Naturally, each of the other coils 400, 600, 800 described herein may also comprise tails similar to those shown and described in relation to the coil 900 of FIG. 9. These tails are not shown in the other figures in the interest of clarity but they may, of course, be present in any coil design.

The layer 910 may be made from a single piece of suitable magnetically-permeable material, e.g., ferrite, of substantially uniform thickness that provides a plane around which the conducting elements are wound to form the first and second loops 906, 908. However, in this coil 900, the layer 910 of magnetically-permeable material is made from a number of ferrite tiles, e.g., tiles 920 and 922.

Figure 10:
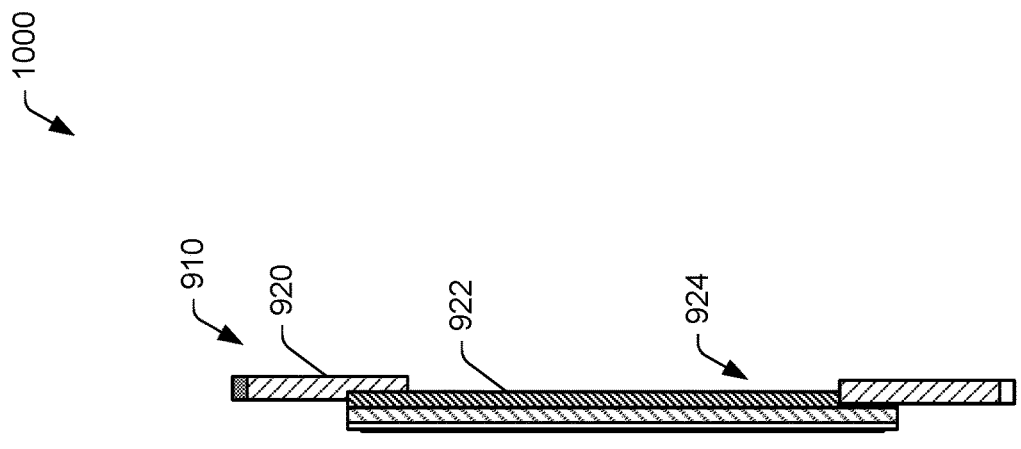
FIG. 10 is a sectional view of a permeable layer in the hybrid solenoid of FIG. 9.

As may be seen more clearly from FIG. 10 viewed in conjunction with FIG. 9, while the tiles 920, 922 are substantially in the same plane, they are arranged with the tile 920 above the tile 922 (from the perspective of FIG. 9) to form a central recess area 924. This configuration allows a central region 926 of the loops 906, 908 to be supported by the layer 910 and distal portions 928, 930 to pass below outer edges of the layer 910 defined at least in part by the tile 920.

As illustrated in FIG. 9, the conducting elements 902, 904 each follow a convoluted path that defines the shape of the first and second loops 906, 908. The loops 906, 908 are arranged in a manner similar to the DD or double-D configuration of the coil 300 of FIG. 3 and the coil 400 of FIG. 4, with the two loops 906, 908 appearing like two letters "D" placed back-to-back. In the coil 900, each of the loops 906, 908 comprises a proximate portion 932, 934, respectively in the central region 926 placed above the tile 922 and a distal portion 928, 930 below the tile 920. In this way, each loop 906, 908 extends both above and below the layer 910 in much the same way as the loops in the solenoid 800 of FIG. 8.

In the central region 926, the conducting elements 902, 904 are laid side-by-side alternating between one conductor and the other. Side portions 936, 938, 940, 942 of the loops 906, 908 between the proximate 932, 934 portions and the distal portions 928, 930 are stacked. In the distal portion 928, 930, as shown, the loops of the conducting elements 902, 904 are laid out side-by-side as per the central region 926. Naturally, this is only one example of how the conducting elements 902, 904 may be laid out in the coil 900. The conductors may be stacked in the distal portions 928, 930, as per the side portions 936, 938, 940, 942. In addition, the conducting elements 902, 904 may be stacked in the distal portions 928, 930 when the side portions 936, 938, 940, 942 are laid out side-by-side. The exact configuration depends on design criteria for the intended use. In FIG. 9, the conducting elements 902, 904 are shown stacked in the portions between proximate and distal. It should be clear from the foregoing that the coil 900 has characteristics of a double-D coil and of a solenoid coil.

As with the previously described coils, the routes followed by the conducting elements 902, 904 are formed so that both conducting elements 902, 904 have substantially equal flux paths and thus substantially equal inductances. This may be achieved by one or more of (i) interaction to substantially the same degree with the layer 910 along the entirety of their respective lengths, (ii) the total radii of bends along their lengths that are substantially the same, and/or (iii) stacking to equalize the number of adjacent loops along their lengths.

As shown in FIG. 9, the paths followed by the conducting elements 902, 904 may not be exactly equal. The curves 916, 918 where the conducting elements 902, 904 enter and leave the coil structure are not the same, and, in both curves 916, 918 the conducting element 904 follows the inner line of the curve. Furthermore, the thickness of the layer 910 is not uniform; it is thicker where the tiles 920 and 922 overlap. Interaction between the conducting elements 902, 904 may be different at the overlapping area as compared to non-overlapping areas of the layer 910 (e.g., ferrite). This too may affect the degree of interaction between each conducting element 902, 904 along its length with the ferrite. It will be appreciated by those possessed of the relevant skills that it is possible to form paths for the conductors that allow for these different lengths and variations in thickness of the layer 910 to achieve more equal interaction, equal radii, and/or equal stacking, and thus a more balanced coil.

Having described the invention by reference to a magnetic coil for wireless power transfer, a charging power-transfer apparatus including a magnetic coil for wireless power transfer, a charging system including a charging power-transfer apparatus for wireless power transfer and a wireless electric vehicle charging system, it is to be understood that the same have been described by way of example only and that modifications and variations such as may occur to those possessed of appropriate knowledge and skills may be made without departure from the spirit and scope of the invention as set forth in the appended claims and equivalents thereof.

The invention claimed is:

1. A magnetic coil structure for wireless power transfer, the coil structure comprising
   a layer of magnetically-permeable material; and
   a plurality of conductors that each follow respective convoluted paths relative to the layer of magnetically-permeable material to form respective inductors, each conductor of the plurality of conductors having an overall proximity to the layer of magnetically-permeable material along a respective length of the conductor that is substantially equal to another overall proximity of another conductor of the plurality of conductors to the layer of magnetically permeable material along a length of the other conductor, the plurality of conductors having substantially equalized inductances based on the convoluted paths and interaction with the magnetically-permeable material.

2. The magnetic coil structure of in claim 1, wherein the respective overall proximity is defined by an average distance between the conductor and the layer of magnetically-permeable material along the respective length of the conductor.

3. The magnetic coil structure of in claim 1, wherein the plurality of conductors are wound to form first and second loops that each comprise at least two layers of one or more turns.

4. The magnetic coil structure of claim 3, wherein each conductor follows a convoluted path that forms both a lower layer in the first loop and an upper layer in the second loop, the lower layer being closer to the layer of magnetically-permeable material than the upper layer.

5. The magnetic coil structure of claim 3, wherein at least a portion of the first and second loops in the at least two layers are stacked.

6. The magnetic coil structure of claim 5, wherein:
   the first and second loops each comprise a proximate portion and a distal portion; and
   the two layers are stacked in the distal portions of the first and second loops.

7. The magnetic coil structure of claim 6, wherein the conductors are laid side-by-side at the proximate portions of the first and second loops.

8. The magnetic coil structure of claim 7, wherein the layer of magnetically-permeable material comprises a substantially planar layer, and wherein the proximate portions of the first and second loops are positioned at one side of the planar layer and the distal portions of the first and second loops are positioned at an opposing side of the planar layer.

9. The magnetic coil structure of claim 7, wherein the layer of magnetically-permeable material comprises a substantially planar layer, and wherein the first and second loops are wound around the substantially planar layer.

10. The magnetic coil structure of claim 1, wherein:
    the plurality of conductors are wound to form first and second loops that each comprise at least two layers of one or more turns; and
    the layer of magnetically-permeable material is polygonal and has a periphery; and
    the at least two layers are stacked along at least a portion of the periphery.

11. The magnetic coil structure of claim 10, wherein:
    a first conductor of the plurality of conductors forms a lower layer at a first portion of the periphery and an upper layer at a second portion of the periphery; and
    a second conductor forms an upper layer at the first portion of the periphery and a lower layer at the second portion of the periphery.

12. A base power-transfer apparatus for a wireless electric vehicle charging system, the base power-transfer apparatus comprising:
    a power converter for converting power from a power supply into a power signal; and
    a coil structure configured to be driven by the power signal to generate a magnetic field, the coil structure comprising:
      a layer of magnetically-permeable material; and
      a plurality of conductors that follow respective convoluted paths relative to the permeable layer to form respective inductors, the plurality of conductors having respective overall proximities to the permeable layer along respective lengths of the plurality of conductors that are substantially equal, the plurality of conductors having substantially equalized inductances based on the convoluted paths and interaction with the magnetically-permeable material.

13. The base power-transfer apparatus of claim 12, wherein the respective overall proximity is defined by an average distance between a conductor and the layer of magnetically-permeable material along the respective length of the conductor.

14. The base power-transfer apparatus of claim 12, wherein the plurality of conductors are wound to form first and second loops that each comprise at least two layers of one or more turns.

15. The base power-transfer apparatus of claim 14, wherein each conductor follows a convoluted path that forms both a lower layer in the first loop and an upper layer in the second loop, the lower layer being closer to the layer of magnetically-permeable material than the upper layer.

16. The base power-transfer apparatus of claim 14, wherein at least a portion of the first and second loops in the at least two layers are stacked.

17. The base power-transfer apparatus of claim 14, wherein:
    the first loop includes a first proximate portion that is adjacent to a second proximate portion of the second loop in a central region of the coil;
    the first loop includes a first distal portion that is located on an opposite side of the coil from a second distal portion of the second loop;
    the conductors are laid side-by-side at the first proximate portion of the first loop and the second proximate portion of the second loop; and
    the conductors are stacked at the first distal portion of the first loop and the second distal portion of the second loop.

18. The base power-transfer apparatus of claim 14, wherein:
    the first proximate portion of the first loop and the second proximate portion of the second loop are each positioned at a first planar surface of the permeable layer; and
    the first distal portion of the first loop and the second distal portion of the second loop are each positioned at a second planar surface of the permeable layer that is opposite the first planar surface.

19. A vehicle power-transfer apparatus for a wireless electric vehicle charging system, the vehicle power-transfer apparatus comprising:
a coil structure configured to receive power from a magnetic field, the coil structure comprising:
a layer of magnetically-permeable material;
a plurality of conductors that follow respective convoluted paths relative to the permeable layer to form respective inductors, a first conductor of the plurality of conductors having a first overall proximity to the permeable layer along a length of the first conductor that is substantially equal to a second overall proximity of a second conductor of the plurality of conductors to the permeable layer along a length of the second conductor, the plurality of conductors having substantially equalized inductances based on the convoluted paths and interaction with the magnetically-permeable material; and
control circuitry for controlling delivery of power from the coil to a battery.

20. The vehicle power-transfer apparatus of claim 19, wherein the first overall proximity is defined by a first average distance between the first conductor and the permeable layer along the length of the first conductor, and the second overall proximity is defined by a second average distance between the second conductor and the permeable layer along the length of the second conductor.

21. The vehicle power-transfer apparatus of claim 19, wherein the plurality of conductors are wound to form first and second loops that each comprise at least two layers of one or more turns.

22. The vehicle power-transfer apparatus of claim 21, wherein each conductor follows a convoluted path that forms both a lower layer in the first loop and an upper layer in the second loop, the lower layer being closer to the layer of magnetically-permeable material than the upper layer.

23. The vehicle power-transfer apparatus of claim 21, wherein:
the first loop includes a first proximate portion that is adjacent to a second proximate portion of the second loop in a central region of the coil;
the first loop includes a first distal portion that is located on an opposite side of the coil from a second distal portion of the second loop
the conductors are laid side-by-side at the proximate first proximate portion of the first loop and the second proximate portions of the second loop; and
the conductors are stacked at the first distal portion of the first loop and the second distal portion of the second loop.

24. The vehicle power-transfer apparatus of claim 21, wherein:
the first proximate portion of the first loop and the second proximate portion of the second loop are each positioned at a first planar surface of the layer of magnetically-permeable material; and
the first distal portion of the first loop and the second distal portion of the second loop are each positioned at a second planar surface of the layer of magnetically-permeable material that is opposite the first planar surface.

* * * * *